US008443340B2

(12) United States Patent
Stairs et al.

(10) Patent No.: US 8,443,340 B2
(45) Date of Patent: May 14, 2013

(54) EXECUTION CAPTURE AND REPLAY BASED DEBUGGING

(75) Inventors: John Stairs, Copenhagen (DK); Thomas Hejlsberg, Horsholm (DK); Jesper Falkebo, Bunkeflostrand (SE)

(73) Assignee: Microsoft Corporation, Redmond, WA (US)

(*) Notice: Subject to any disclaimer, the term of this patent is extended or adjusted under 35 U.S.C. 154(b) by 424 days.

(21) Appl. No.: 12/815,546

(22) Filed: Jun. 15, 2010

(65) Prior Publication Data

US 2011/0307870 A1 Dec. 15, 2011

(51) Int. Cl.
*G06F 9/44* (2006.01)
(52) U.S. Cl.
USPC ............ 717/128; 717/100; 717/124; 717/125
(58) Field of Classification Search .................. None
See application file for complete search history.

(56) References Cited

U.S. PATENT DOCUMENTS

| | | | |
|---|---|---|---|
| 5,121,489 | A | 6/1992 | Andrews |
| 5,870,607 | A | 2/1999 | Netzer |
| 6,901,581 | B1 | 5/2005 | Schneider |
| 7,810,071 | B2 * | 10/2010 | Thebes et al. ................ 717/124 |
| 7,958,497 | B1 * | 6/2011 | Lindo et al. .................. 717/128 |
| 8,122,436 | B2 * | 2/2012 | Costa et al. .................. 717/128 |
| 8,214,807 | B2 * | 7/2012 | Bestgen et al. ............... 717/128 |
| 2005/0278728 | A1 * | 12/2005 | Klementiev .................. 719/328 |
| 2007/0288902 | A1 * | 12/2007 | Lev et al. ..................... 717/124 |
| 2010/0095265 | A1 * | 4/2010 | Ewing et al. ................. 717/100 |
| 2010/0211933 | A1 * | 8/2010 | Kiel et al. .................... 717/125 |
| 2012/0174069 | A1 * | 7/2012 | Zavatone ..................... 717/124 |

OTHER PUBLICATIONS

Xue et al., MPIWiz: subgroup reproducible replay of mpi applications, Feb. 2009, 10 pages, <http://delivery.acm.org/10.1145/1510000/1504213/p251-xue.pdf>.*
Orso et al., Selective capture and replay of program executions, Jul. 2005, 7 pages, <http://delivery.acm.org/10.1145/1090000/1083251/p5-orso.pdf>.*
Laadan et al., Transparent, lightweight application execution replay on commodity multiprocessor operating systems, Jun. 2010, 12 pages, <http://delivery.acm.org/10.1145/1820000/1811057/p155-laadan.pdf>.*
Gottbrath, et al., "Quickly Identifying the Cause of Software Bugs with ReplayEngine", Retrieved at << www.totalviewtech.com/pdf/whitepaper_replayengine.pdf >>, White Paper, Jul. 2008, pp. 5.
Leblanc, et al., "Debugging Parallel Programs with Instant Replay", Retrieved at << http://pages.cs.wisc.edu/~bart/739/papers/instantreplay.pdf >>, IEEE Transactions on Computers, vol. 36, No. 4, Apr. 1987, pp. 471-482.

(Continued)

*Primary Examiner* — Thuy Dao
(74) *Attorney, Agent, or Firm* — Turk IP Law, LLC

(57) ABSTRACT

A debugging tool is provided that is capable of recording code paths taken during a program's execution, and along the way capture the memory state at configurable points in time such as function exits or statements. The tool also records interactions with external systems like a database, and captures which statements resulted in interactions with these systems. An analysis of the output of the debugging tool enables a developer to understand which part of the code executed; what the value of relevant variables were at configurable points in time; and which code statements correlate to which interactions with external systems.

20 Claims, 8 Drawing Sheets

OTHER PUBLICATIONS

Srinivasan, et al., "Flashback: A Lightweight Extension for Rollback and Deterministic Replay for Software Debugging", Retrieved at << http://www.usenix.org/event/usenix04/tech/general/full_papers/srinivasan/srinivasan_html/paper.html >>, USENIX Annual Technical Conference, Proceedings of the annual conference on USENIX Annual Technical Conference, Jun. 27-Jul. 2, 2004, pp. 29.

Narayanasamy, et al., "BugNet: Continuously Recording Program Execution for Deterministic Replay Debugging", Retrieved at << https://cseweb.ucsd.edu/users/gpokam/ISCA-05-BugNet.pdf >>, In Proceedings of the International Symposium on Computer Architecture, Jun. 2005, pp. 1-12.

* cited by examiner

EXECUTION CAPTURE AND REPLAY BASED DEBUGGING

BACKGROUND

The rising number of venues of software utilization leads to rising potential for a higher number of errors and faults to be introduced into modern systems. The potential for introduction of errors and faults into a modern system makes practice of debugging, or finding and removing errors crucial to system integrity. A system originates from more than source code, and may include metadata, resource files, or other kind of information. Debugging efforts to maintain system integrity are in turn defined by the complexity of the system.

Debugging complexity varies based on the effort in correcting simple errors. The effort may be in performing lengthy data collection and analysis to do exhaustive path analysis to attempt thorough exploration of programming execution paths. The debugging skill of the programmer or the quality assurance team may also be a major factor in efficient and thorough debugging of an application. However, system complexity has the higher impact in demanding greater quantity of software debugging effort. Other factors that affect software debugging efforts are programming language(s) used in coding the software, and utilization of available tools such as debuggers. Debuggers enhance debugging efforts by allowing the programmer to start, stop, and pause the execution of a program. Debuggers also enable the programmer to monitor an application's execution and to insert breakpoints (stops) throughout the execution path for analysis.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to capturing the memory state of an application and input/output (I/O) to external systems throughout program execution, and replaying the captured memory state and external system—I/O interactions. According to some embodiments, the memory state of the application may be captured at configurable points during the application's execution, which may be entry or exit points of the functions or subroutines of the application. Capturing the external system—I/O interactions may include recording external system calls and related code statements launching the calls. Additionally, replaying may permit stepping in, out, over, and back in time to a previous statement or function. An output of a debugging tool according to embodiments may provide which code paths were taken, values of variables, and statements, which directly or indirectly cause interactions with external systems.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
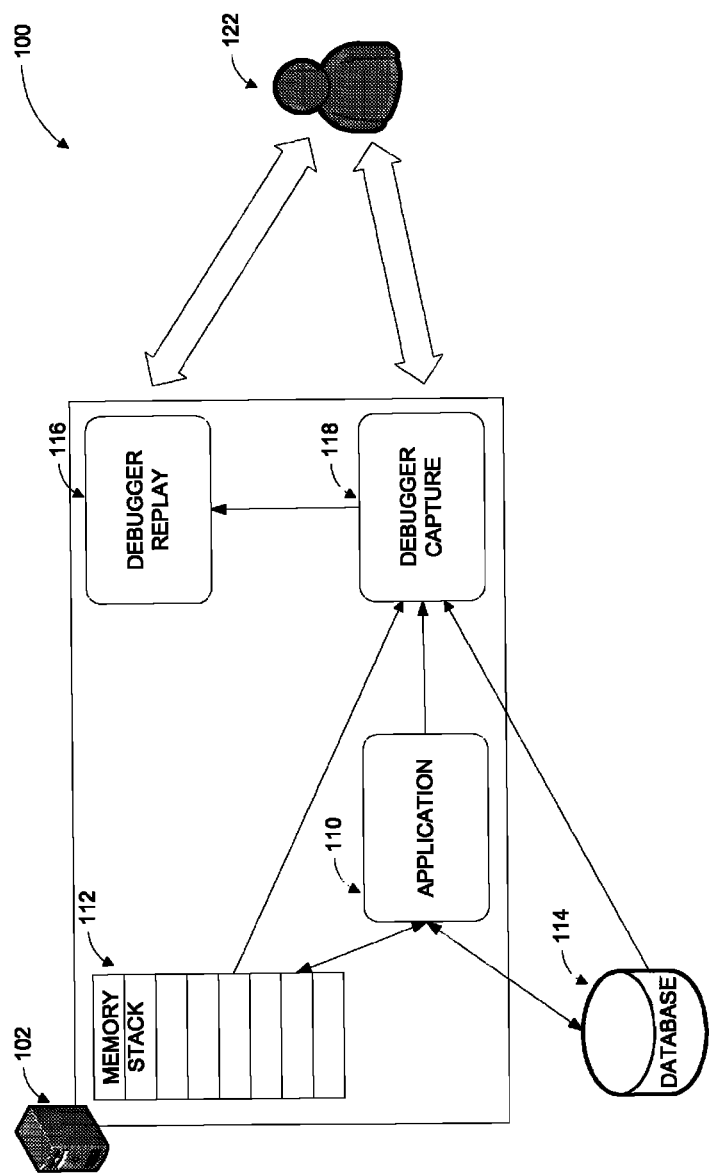
FIG. 1 is a conceptual diagram illustrating a computing device capturing and replaying an application's execution during access to an external system.

As briefly described above, an application's execution may be captured through recording memory states of the application and input/output (I/O)—external system interactions throughout the application's execution. The memory states of the application may be captured at configurable points. External system—I/O interactions may be captured by recording the external system calls and related code statements. Replaying the captured information movement in a chosen direction in the execution path may be enabled. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process, a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing remote application services and related network communications. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes conceptual diagram 100 illustrating a computing device capturing and replaying an application's execution during access to an external system. User 122 may interact with system 102 to engage in a debugging session. During the debugging session system 102 may execute an application 110. The application may interact with memory stack 112 in the execution of its methods to store its method variables. The application may also interact with an external system 114. The external system may, for example, be a database.

During the execution, the user may initiate a debugger to capture the execution (118). The debugger may communicate with the application 110, the memory stack 112 of the application and the external system 114 to capture the application's execution. After completion of capture, in a future timeframe, the user may initiate the debugger to replay the application's execution (116). The user may also save the capture to a media and have another user replay the capture on a totally different computer without the same components (e.g. the external system does not need to be present).

In an example embodiment, the debugger may record code paths taken during the application's execution. The debugger may also capture the memory state at configurable points in time. Examples of configurable points may include, but are not limited to, code statements, method entry points, and method exit points. The debugger may also record interactions with external systems. Example external systems may include a database or a network. The debugger may also capture the application's code statements that result in interactions with the external systems. As an output, the debugger may provide a user with an analysis display, which may show what code executed; what the values of variables were at configurable points in time, and how code statements correlate to external system interactions. Example code statement—external system interaction correlations may include how code statements lead to database queries, directly or indirectly.

In another embodiment, the debugger may capture a relevant memory state such as variable values of methods at method entry and/or exit, or before each statement, as mentioned above. The debugger may also analyze the application's captured execution and determine which methods were called and what the variable values may be at each point in time.

The debugger may further capture interactions with a configurable set of external systems, an example of which may be a database. The debugger may analyze the application's captured execution to correlate the interactions with code statements. In the example of interactions with a database during the application's execution, the debugger may list all Structured Query Language (SQL) statements that may have been executed during the application's execution and link back the external system statements to the application code statements initiating the external system statements. The debugger may also link the full call stack and memory contents at the time to the statement's execution. The external system statements such as SQL queries executed by the application may be displayed to the user.

The debugger may use the captured information to provide a full or partial replay of the application's execution. A full replay of the application's execution may include providing information associated with executed methods and statements, memory states for each, and external system interactions during the application's execution from launch to exit. The replay may also be partial. The debugger may also enable stopping at breakpoints, stepping in, out, and over functionality to each execution path during the replay. The debugger may also enable stepping back in time viewing relevant variable information at any given time point during the execution of the application. The debugger may show the values of each method throughout the application's execution. In addition, the debugger may provide access to third party applications to display the external system statements. An example of which may be a formatting application that may display an SQL statement in a color-coded and line-returned format based on individual elements of the statement.

Figure 2A:
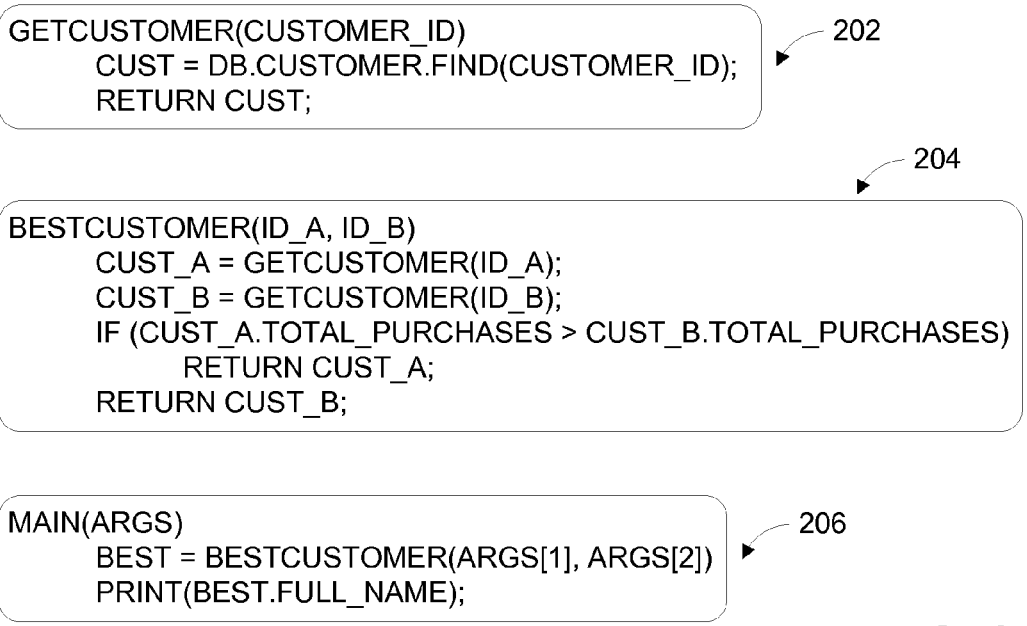
FIG. 2A is a diagram displaying an example code to be used in capturing and replaying an application's execution.

FIG. 2A is a diagram displaying an example code to be used in capturing and replaying an application's execution. The example code in the diagram includes an example MAIN method 206. The MAIN method 206 may be the program entry point where a user may provide arguments (ARGS). The MAIN method 206 may call a sub-method BESTCUSTOMER 204 to handle some of its logic work. The MAIN method 206 may pass user input as arguments 1 and 2 to BESTCUSTOMER 204. The BESTCUSTOMER method may receive the user input variables and call an external system interaction method GETCUSTOMER 202. GETCUSTOMER 202 may initiate an external system call, which may execute the external system statement to receive an object containing the values returned by the external system (a database in the example code). The returned object then may be evaluated by BESTCUSTOMER 204 by applying logic statements returned to the MAIN method 206.

Figure 2B:
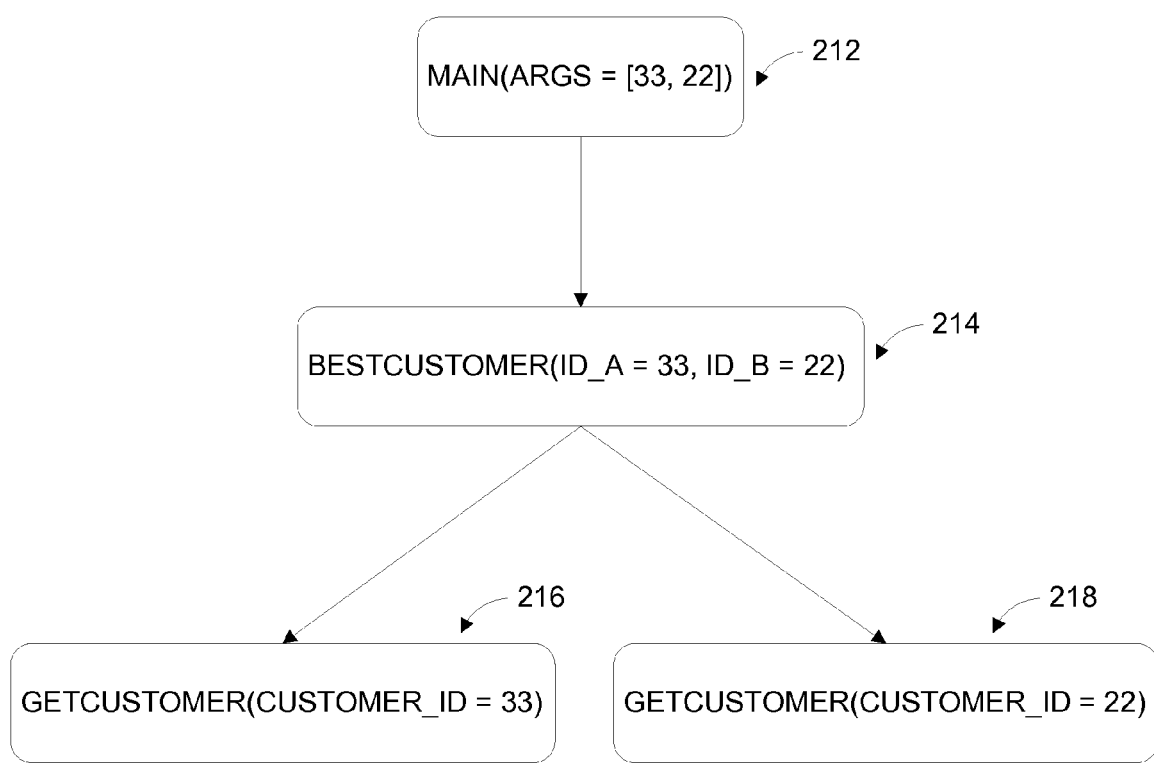
FIG. 2B is an execution path diagram displaying execution of example methods and their memory states of the code of FIG. 2A.

FIG. 2B is an execution path diagram displaying execution of example methods and their memory states of the code of FIG. 2A. The call tree of FIG. 2B includes methods of the code of FIG. 2A: MAIN 212, BESTCUSTOMER 214, and resulting two database query methods GETCUSTOMER 216 and GETCUSTOMER 218. The database query methods (as well as the parent methods) are displayed by the tool along with a listing of their variables and variable values. As shown by the call tree, execution of MAIN 212 results in execution of BESTCUSTOMER 214, which splits into two calls for GETCUSTOMER 216 and 218 handling different variables of BESTCUSTOMER 214.

Figure 3A:
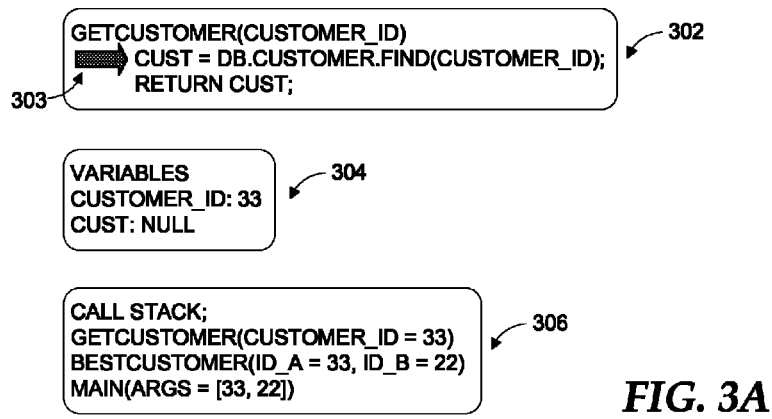
FIGS. 3A and 3B illustrate analyses of one of the statements in the example code of FIG. 2A at two different time points in a debugging tool according to embodiments.
Figure 3B:
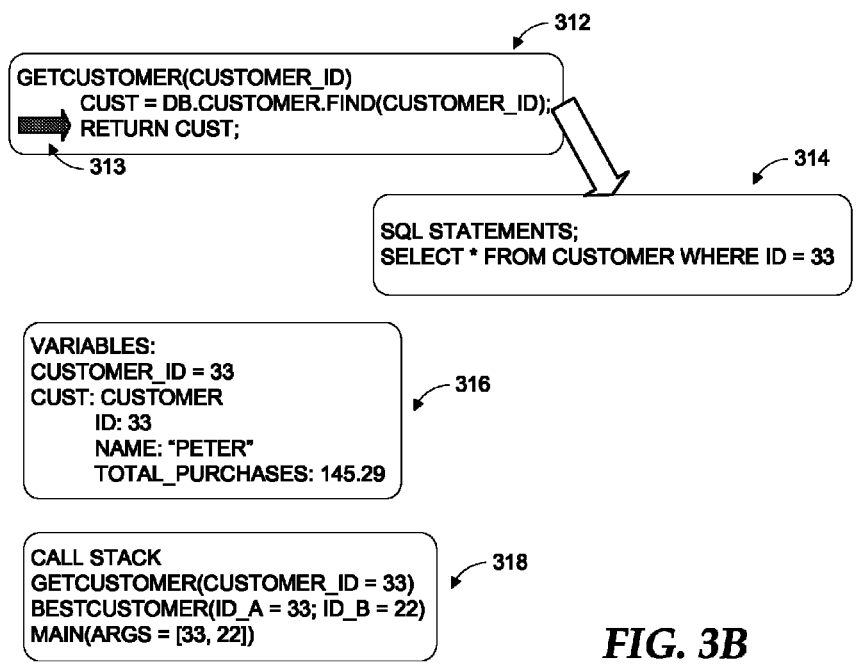

FIGS. 3A and 3B illustrate analyses of one of the database query statements of the example code of FIG. 2A at two different time points in a debugging tool according to embodiments. Two different time points are used in the example analysis results. In FIG. 3A, arrow 303 on the code 302 of GETCUSTOMER method indicates that the user has stopped the replay before the method was executed. In addition to the code 302 of the method, values of variables 304 (again at the stopped time point) and call stack information 306 are displayed.

In FIG. 3B, the replay is stopped after the execution of the query as indicated by arrow 313 on the code 312 of the same GETCUSTOMER method. Since the statement is already executed at this time point, the executed query statement 314 is also displayed. Variable values 316 include input and output variable values (result from executed query). Call stack 318 is the same as in FIG. 3A.

Figure 4A:
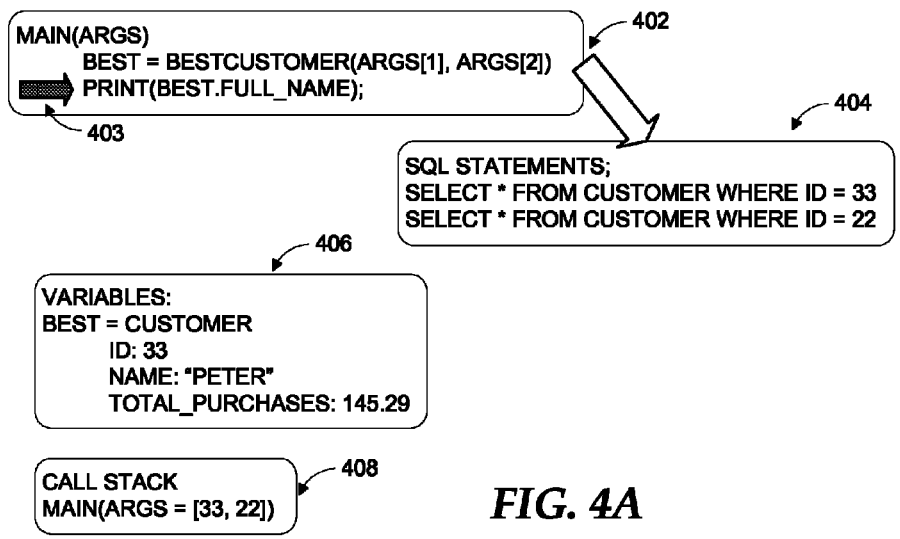
FIG. 4A illustrates an analysis of another method in the example code of FIG. 2A with two external system interactions.

FIG. 4A illustrates an analysis of another method in the example code of FIG. 2A with two external system interactions. The example analysis in FIG. 4A illustrates the time point at which the execution of the code of FIG. 2A has reached completion of the child methods and results having been returned to the MAIN method 402 as indicated by arrow 403. At this time point, the BESTCUSTOMER method and its two GETCUSTOMER methods have been executed and query results returned to MAIN method 402. Thus, the executed database queries 404 are also displayed. Variable values 406 are associated with MAIN method 402 after the execution of the other methods (at the selected time point). Since the user is back at the MAIN method 402, the call stack 408 only lists the MAIN method 402.

Figure 4B:
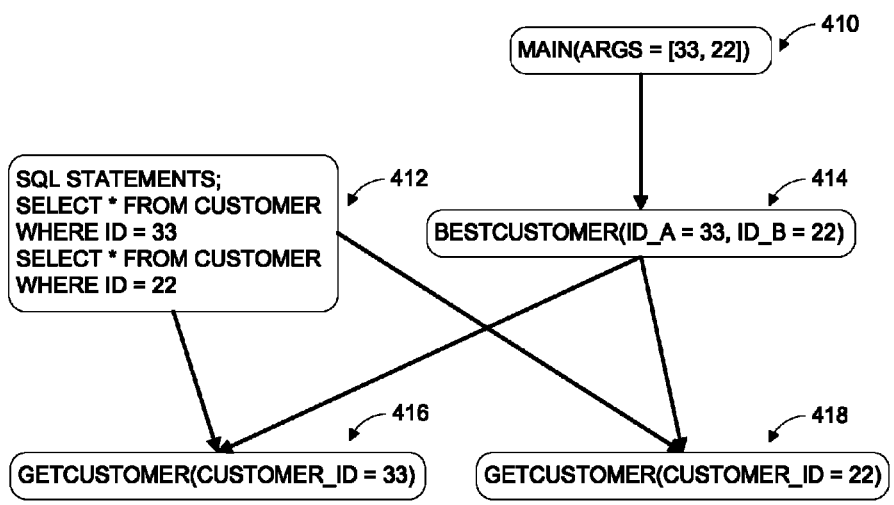
FIG. 4B illustrates how a debugging tool according to embodiments can display where external system statements executed as part of the code of FIG. 2A point back in a call tree of the code.

FIG. 4B illustrates how a debugging tool according to embodiments can display where external system statements executed as part of the code of FIG. 2A point back in a call tree of the code. The call tree shown in FIG. 4B is similar to the call tree of FIG. 2B displaying the execution paths of the example code of FIG. 2A with MAIN method 410, BESTCUSTOMER method 414, and the two GETCUSTOMER methods 416 and 418. In addition to what was shown in FIG. 2B, the call tree includes the executed external system statements (SQL queries) 412. Each of the two queries is correlated to their respective methods such that the user can determine which query resulted from which method. The call tree and the external system statements also include variable values enabling the user to track the execution based on variable values.

Figure 5:
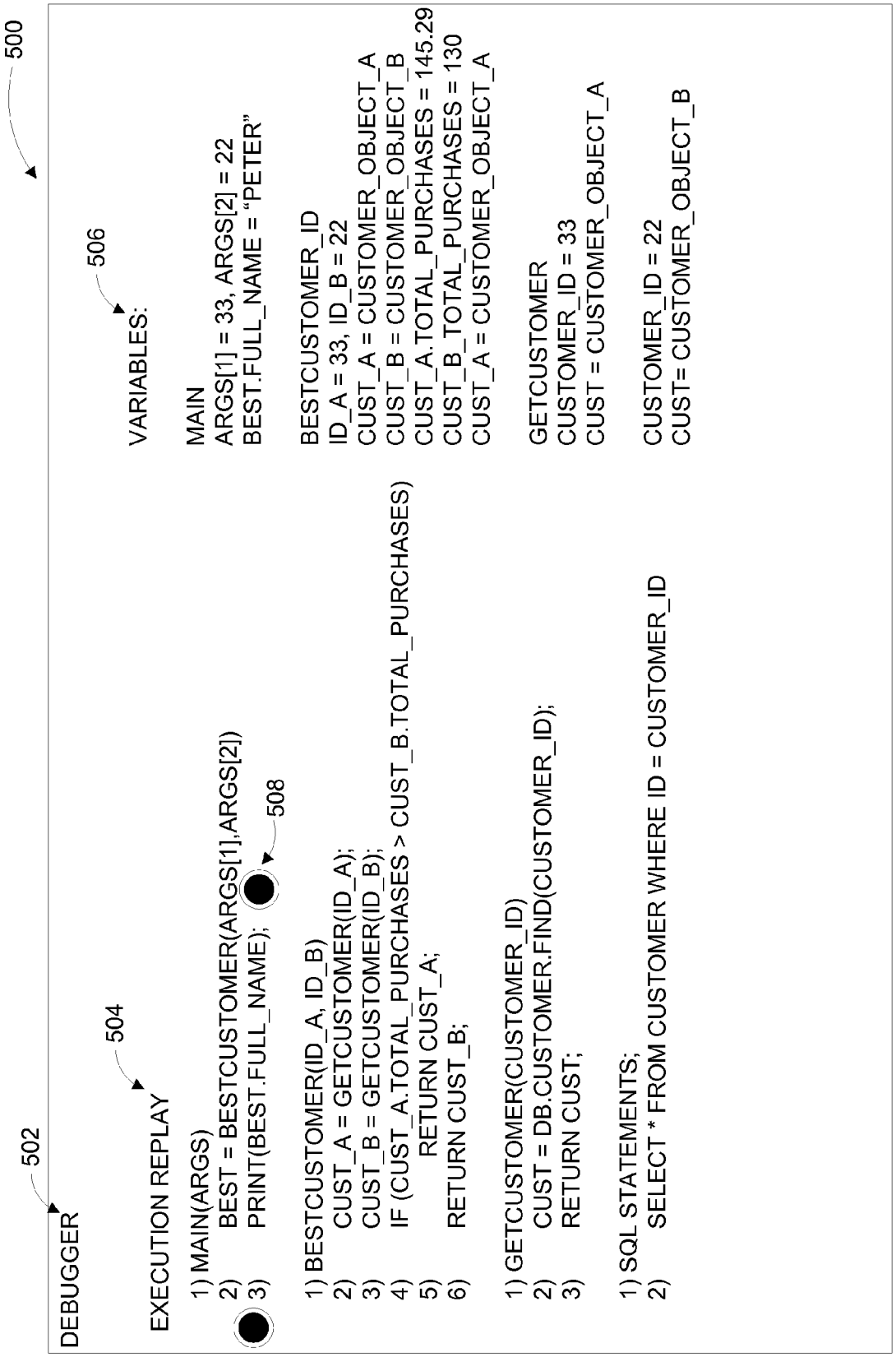
FIG. 5 is a diagram of example user interface showing full execution path along with variables for executed methods at a step in time of the execution.

FIG. 5 is a diagram of example user interface (UI) 500 showing full execution path along with variable values for the executed methods at a step in time during application execution. UI 500 may display debugger 502 with the selected full execution path, which may display the application's execution replay 504 with step by step methods and statements as they were executed. The execution replay may be stopped at a chosen step by the user and marked by adjoining markers 508. Of course, other marking methods, graphical or textual, may also be employed. The variables box 506 may display the memory stack for each method in the application at the time point when the execution replay was stopped by the user.

The example systems in FIGS. 1, 2A, 2B, 3A, 3B, 4A, 4B, and 5 have been described with specific methods, statements, software modules, and interactions. Embodiments are not limited to systems according to these example configurations. Execution capture and replay based debugging may be implemented in configurations employing fewer or additional components and performing other tasks. Furthermore, various protocols, exchanges, and interfaces may be implemented using the principles described herein.

Figure 6:
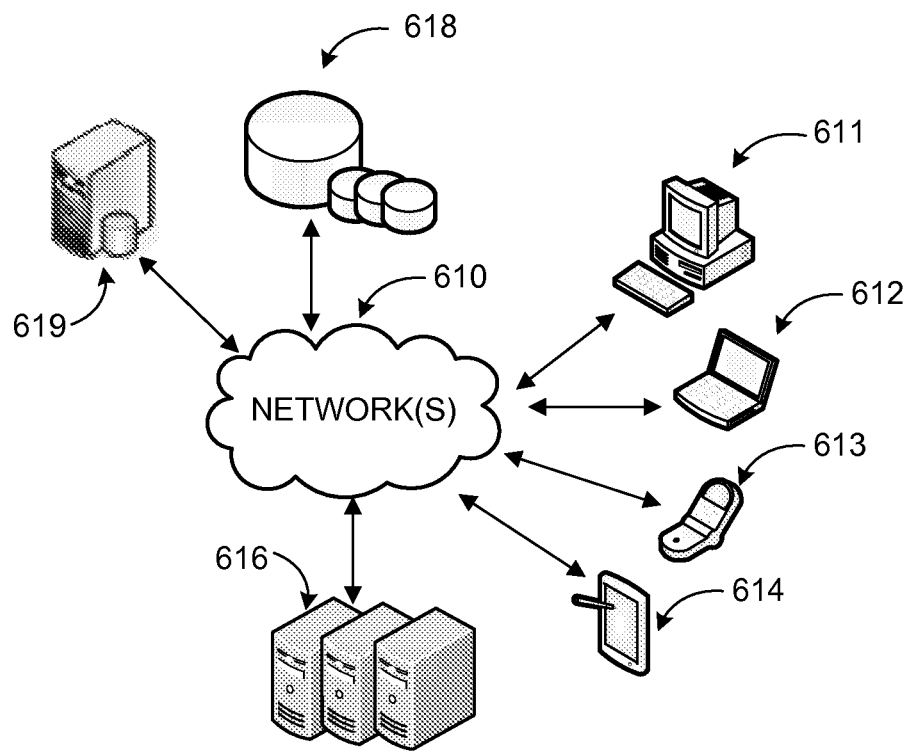
FIG. 6 is a networked environment, where a system according to embodiments may be implemented.

FIG. 6 is an example networked environment, where embodiments may be implemented. A platform providing debugging services may be implemented via software executed over one or more servers 616 such as a hosted service. The platform may communicate with client applications on individual computing devices such as desktop computer 611, laptop computer 612, smart phone 613, or handheld computing device 614 (client devices') through network(s) 610.

As discussed above, users may access a debugger executed on one or more of servers 616 through client devices 611-614. A debugging engine executed on server 616 may expose a third party API to enable other applications to display external system statements. The executed application may retrieve relevant data from data store(s) 618 directly or through database server 619.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a framework for execution capture and replay based debugging. Furthermore, the networked environments discussed in FIG. 6 are for illustration purposes only. Embodiments are not limited to the example applications, modules, or processes.

Figure 7:
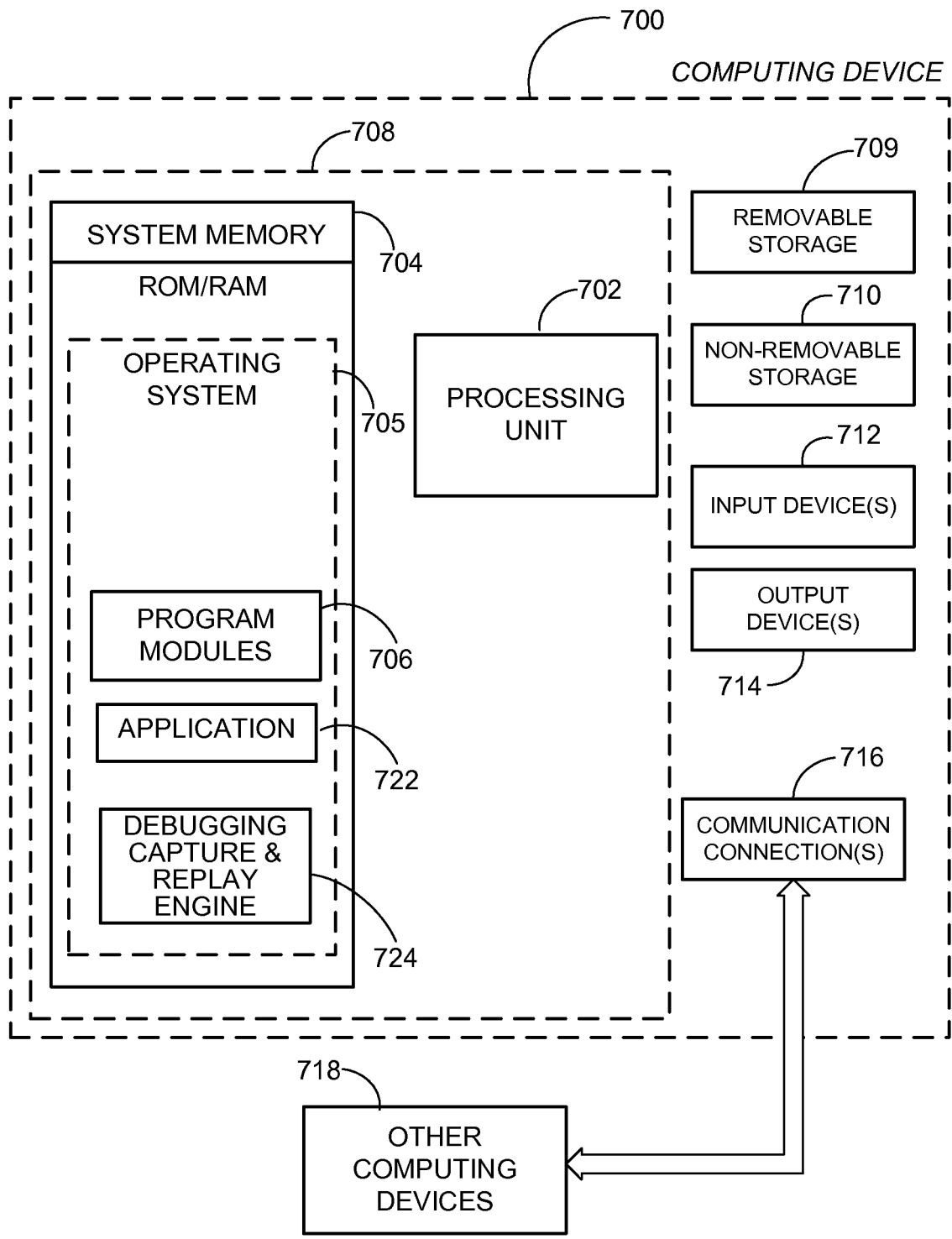
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be a computer executing an application enabling capture and replay based debugging according to embodiments and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706, application 722, and debugging capture and replay engine 724.

Application 722 may be any application that is executed on computing device 700. Debugging capture and replay engine 724 may access application 722's code, capture its execution enabling a user to stop the execution at various configurable points. Debugging capture and replay engine 724 may also capture memory states, executed statements, and external system interactions at various time points, then replay the captured execution along with relevant information enabling the user to determine problem points and program states at those points as described previously. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wired or wireless network in a distributed computing environment, a satellite link, a cellular link, a short range network, and comparable mechanisms. Other devices 718 may include computer device(s) that execute communication applications, servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
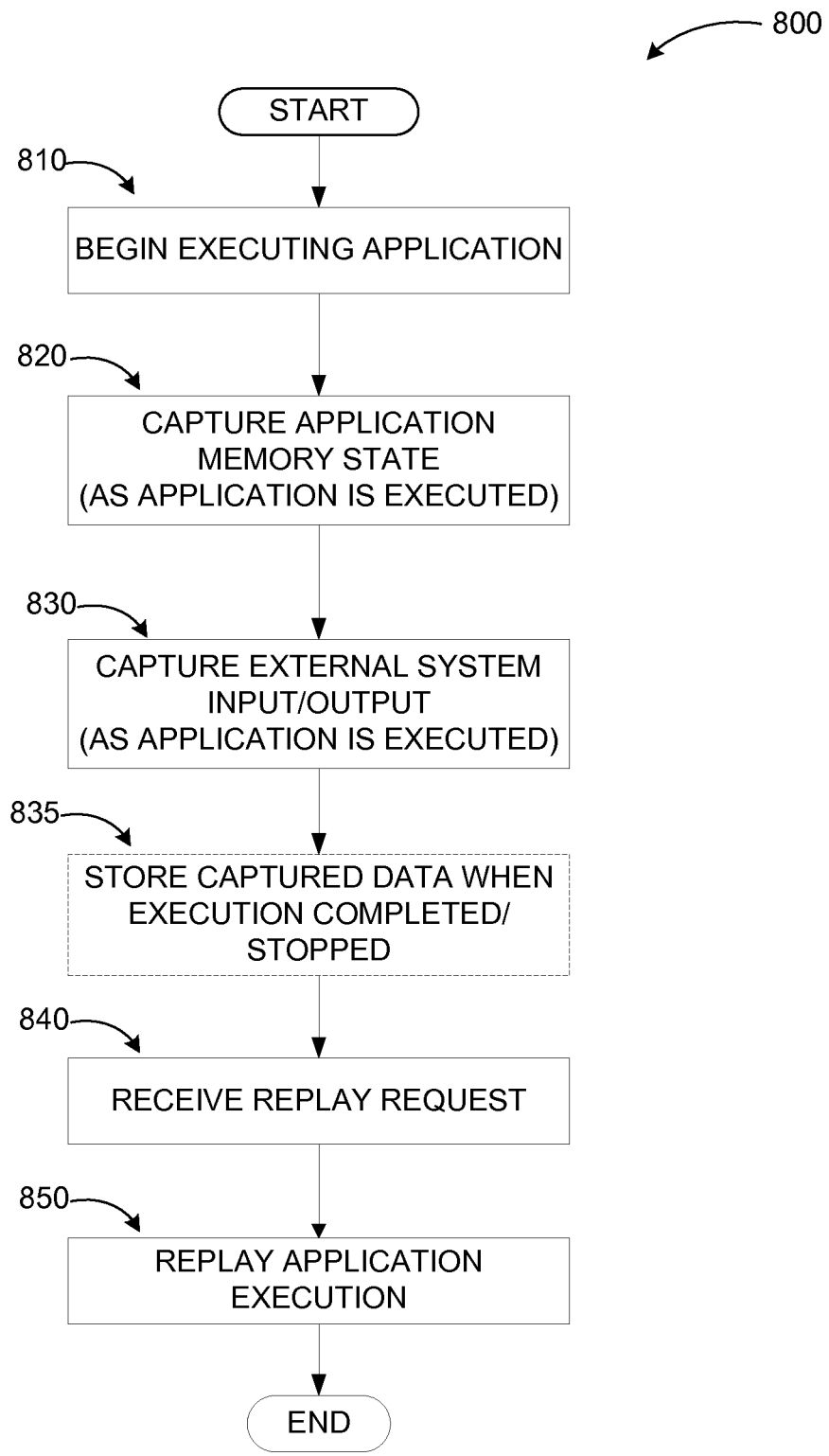
FIG. 8 illustrates a logic flow diagram for a process of debugging an application based on capturing and replaying the application's execution according to embodiments.

FIG. 8 illustrates a logic flow diagram for process 800 of debugging an application based on capturing and replaying the application's execution according to embodiments. Process 800 may be implemented as part of a debugging application in a networked or standalone computing device.

Process 800 begins with operation 810, where an application may begin to be executed to be captured during a debugging session. The application may contain a number of methods and external system statements. At operation 820, the debugger may start to capture the application being executed. The application's execution may instantiate the capture. The debugger may capture the memory state of the application at configurable points such as function entry, function exit, or statement begin points. Capture of the memory state may involve capturing the memory stack that holds various variables of each method of the application throughout the application execution path at a selected time point.

At operation 830 the debugger may capture external system interactions with the application being executed. The debugger may capture the external system statements such as network or database calls and link them to the application code that initiated the external system statements. The debugger may also capture various variable values of the external system statements throughout the execution path. Operations 820 and 830 happen concurrently and may terminate when the execution of the application is completed or stopped at a selected point. A system according to embodiments is not limited to capturing database or network calls. Statements from any other configured external system may be captured. A provider may be written for any other system so that the system may know how to capture the application's interaction with it.

Upon completion or stopping of the execution of the application, the captured data may be stored and the process paused at optional operation 835. Remaining operations may resume at any time with operation 840, where the debugger may receive a replay request from a user. The replay request may be a full replay showing the entire execution path of the application. Alternatively, the replay request may be a partial replay request that may show a selected execution path of the application. The debugger may replay the application's execution at operation 850. The replay may show the application's method call stack along with memory stack displaying variable values at selected points in time. The replay may step backwards from selected point in time.

The operations included in process 800 are for illustration purposes. Execution capture and replay based debugging may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for debugging a software application through capture and replay of execution, the method comprising:

starting the application's execution; capturing execution paths of the application;

capturing a memory state of the application's execution at configurable points by a debugger;

capturing an external system interaction of the application by the debugger;

receiving a replay request at the debugger;

replaying the application's execution based on a requested time point after completion of capturing;

stopping the replaying at a user selected step of the application's execution and marking the user selected step with adjoining markers; and providing access to a third party application to display the external system interaction in at least one of: a color-coded format and a line-returned format based on individual elements of the external system interaction.

2. The method of claim 1, wherein capturing the memory state further comprises capturing a plurality of variable values associated with each method of the application.

3. The method of claim 2, wherein capturing the memory state further comprises capturing a memory stack holding the plurality of variable values during the application's execution.

4. The method of claim 2, wherein the memory state is captured at least one from set of: a method entry, a method exit, and a beginning of a statement.

5. The method of claim 2, wherein capturing the memory state further comprises capturing a call stack of the application to record an order of executed methods.

6. The method of claim 1, wherein capturing the external system interaction further comprises capturing execution of an external system statement and correlating the executed external system statement to a code statement of the application.

7. The method of claim 6, wherein the external system statement is one of: a database call, a network call, and a system call.

8. The method of claim 1, wherein the application's execution is replayed from launch to end.

9. The method of claim 1, wherein the application's execution is replayed between user selected points.

10. The method of claim 1, wherein replaying the application's execution includes displaying a call tree of methods within the application and executed external system statements correlated to corresponding methods.

11. The method of claim 1, wherein replaying the application's execution further includes displaying a selected method, an external system statement associated with the selected method, one or more variable values associated with the method, and a call stack associated with the method at a selected time point in the selected method's execution.

12. A computing device for debugging a software application through capture and replay of execution, the computing device comprising:
   a memory storing executable instructions and application variable values;
   a processor coupled to the memory, the processor executing an application and a debugger, wherein the debugger is configured to:
   during an execution of the application, capture execution paths of the application, a memory state, and an external system statement at configurable points;
   in response to receiving a replay request, replay the application's execution based on captured information, wherein the replay includes at least one from a set of:
   display of a call tree of methods within the application, code of selected methods, variable values of selected methods, and call stack associated with selected methods;
   provide access to a third party application to display the external system statement in at least one of: a color-coded format and a line-returned format based on individual elements of the external system statement; and
   stop the replay at a user selected step of the application's execution and mark the user selected step with adjoining markers.

13. The computing device of claim 12, wherein the variable values are received from a memory stack at a configurable point indicated by a user.

14. The computing device of claim 13, wherein the configurable point includes one of: a function entry, a function exit, and a statement beginning.

15. The computing device of claim 12, wherein the debugger is further configured to go back at least one step from a step of current execution breakpoint while replaying the application's execution.

16. The computing device of claim 12, wherein the debugger is further configured to display external system interactions caused by each statement of the application through one of a direct method and indirect method.

17. The computing device of claim 12, wherein the application's execution instantiates the debugger to capture the application's execution.

18. A computer-readable memory device with instructions stored thereon for debugging a software application through capture and replay of execution, the instructions comprising:
   during an execution of the application, capturing execution paths of the application, a memory state, and an external system statement at configurable points comprising one of: a function entry, a function exit, and a statement beginning;
   in response to receiving a replay request, replaying the application's execution based on captured information, wherein the replay includes at least one from a set of: display of a call tree of methods within the application, a list of executed external system statements correlated to methods of the application, code of selected methods, variable values of selected methods, and call stack associated with selected methods;
   providing an access to a third party application to display the external system statements in at least one of: a color-coded format and a line-returned format based on individual elements of the external system statements; and
   stopping the replay at a user selected step of the application's execution and marking the user selected step with adjoining markers.

19. The computer-readable memory device of claim 18, wherein the external system is a database and the external system statements are database queries.

20. The computer-readable memory device of claim 18, wherein the instructions further comprise:
   enabling the replay to one of: step in a statement, step out of a statement, step over a statement, and step back in time to view variable values associated with a displayed statement.

* * * * *